United States Patent
Cao

(10) Patent No.: US 12,025,889 B2
(45) Date of Patent: Jul. 2, 2024

(54) DISPLAY PANEL AND DISPLAY DEVICE

(71) Applicant: TCL China Star Optoelectronics Technology Co., Ltd., Guangdong (CN)

(72) Inventor: Wu Cao, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/599,575

(22) PCT Filed: Jul. 21, 2021

(86) PCT No.: PCT/CN2021/107680
§ 371 (c)(1),
(2) Date: Sep. 29, 2021

(87) PCT Pub. No.: WO2023/279440
PCT Pub. Date: Jan. 12, 2023

(65) Prior Publication Data
US 2024/0027849 A1    Jan. 25, 2024

(30) Foreign Application Priority Data
Jul. 9, 2021   (CN) .......................... 202110775859.X

(51) Int. Cl.
G02F 1/1343    (2006.01)
G02F 1/1335    (2006.01)
G02F 1/1362    (2006.01)
G02F 1/1368    (2006.01)

(52) U.S. Cl.
CPC .... G02F 1/134345 (2021.01); G02F 1/13624 (2013.01); G02F 1/1368 (2013.01); *G02F 2201/52* (2013.01)

(58) Field of Classification Search
CPC ............. G02F 1/1335; G02F 1/133514; G02F 1/1343; G02F 1/134345; G02F 1/134309; G02F 1/1362; G02F 1/13624; G02F 1/1368; G02F 2201/52
See application file for complete search history.

(56) References Cited

U.S. PATENT DOCUMENTS

| 2011/0019140 | A1 | 1/2011 | Kim et al. |
| 2012/0154727 | A1 | 6/2012 | Chang et al. |
| 2020/0081282 | A1* | 3/2020 | Tae .................. G02F 1/133514 |

(Continued)

FOREIGN PATENT DOCUMENTS

| CN | 104155813 | 11/2014 |
| CN | 104460077 | 3/2015 |
| CN | 107065350 | 8/2017 |

(Continued)

*Primary Examiner* — Thoi V Duong

(57) ABSTRACT

The present application provides a display panel and a display device. A blue sub-pixel of the display panel has more display domains than a red sub-pixel and a green sub-pixel. The blue sub-pixel has a differential design while the red sub-pixel and the green sub-pixel maintain their original designs. Under a precondition of ensuring light transmittance, a lower proportion of light is emitted by the blue sub-pixels in a displayed screen when viewed at wide viewing angles, so that the present application can alleviate a color shift problem at wide viewing angles of a conventional liquid crystal display.

10 Claims, 5 Drawing Sheets

(56) References Cited

U.S. PATENT DOCUMENTS

2021/0333650 A1\* 10/2021 Cao .................. G02F 1/136286

FOREIGN PATENT DOCUMENTS

| CN | 109285474 | 1/2019 |
| --- | --- | --- |
| CN | 110895376 | 3/2020 |
| CN | 111221194 | 6/2020 |
| CN | 111240106 | 6/2020 |
| CN | 111427210 | 7/2020 |
| CN | 113075825 | 7/2021 |
| JP | 2010-181838 | 8/2010 |

\* cited by examiner

DISPLAY PANEL AND DISPLAY DEVICE

RELATED APPLICATIONS

This application is a National Phase of PCT Patent Application No. PCT/CN2021/107680 having International filing date of Jul. 21, 2021, which claims the benefit of priority of Chinese Patent Application No. 202110775859.X filed on Jul. 9, 2021. The contents of the above applications are all incorporated by reference as if fully set forth herein in their entirety.

FIELD AND BACKGROUND OF THE INVENTION

The present application relates to a field of display technology and in particular, to a display panel and a display device.

With the development of liquid crystal display (LCD) technologies, there has been a trend towards liquid crystal display devices with high light transmittance and wide viewing angles. How to improve light transmittance and viewing angles has become one of important directions of future development. At present, there are various wide-viewing-angle LCDs available on the market, such as in-plane switching (IPS) LCDs and multi-domain vertical alignment (MVA) LCDs. The MVA LCDs divide a sub-pixel into multiple domains. When power is on, liquid crystal molecules are tilted toward different directions, so that there is almost no difference in viewing effects when viewed from different directions, and as a result, viewing angles can have a wider range. Although the MVA LCDs have wide viewing angles, a gamma curve is offset when viewed from a side at wide viewing angles, causing a color shift problem and affecting the viewing effects.

Therefore, there is a need to solve the problem that conventional LCDs have color shifts at wide viewing angles.

SUMMARY OF THE INVENTION

The present application provides a display panel and a display device to solve a technical problem that LCDs have color shifts at wide viewing angles.

Accordingly, the present application provides technical solutions as follows.

The present application provides a display panel, comprising:
  red sub-pixels, green sub-pixels, and blue sub-pixels,
  wherein the red sub-pixels, the green sub-pixels, and the blue sub-pixels each comprise a plurality of display domains, and a number of the display domains of each blue sub-pixel is greater than a number of the display domains of each red sub-pixel and is also greater than a number of the display domains of each green sub-pixel.

In the display panel according to one embodiment of the present application, the red sub-pixels and the green sub-pixels each comprise four display domains, the blue sub-pixels each comprise eight display domains, the blue sub-pixels each comprise a first pixel area and a second pixel area spaced apart from each other, and the first pixel areas and the second pixel areas each comprise four display domains.

In the display panel according to one embodiment of the present application, the red sub-pixels, the green sub-pixels, and the blue sub-pixels all comprise a plurality of thin film transistors (TFTs), and a number of the plurality of TFTs of each blue sub-pixel is greater than a number of the plurality of TFTs of each red sub-pixel and a number of the plurality of TFTs of each green sub-pixel, and a plurality of gates of the plurality of TFTs of each of the red sub-pixels, the green sub-pixels, and the blue sub-pixels are connected to a same gate scan line.

In the display panel according to one embodiment of the present application, for each blue sub-pixel, the first pixel area and the second pixel area are arranged at two opposite sides of the gate scan line.

In the display panel according to one embodiment of the present application, for each blue sub-pixel, brightness of the first pixel area is greater than brightness of the second pixel area; and the first pixel area, the red sub-pixel, and the green sub-pixel are arranged at a same side of the gate scan line.

In the display panel according to one embodiment of the present application, for each blue sub-pixel, the first pixel area and the second pixel area are arranged at a same side of the gate scan line.

In the display panel according to one embodiment of the present application, an area ratio of the first pixel area to the second pixel area is less than 2:3.

In the display panel according to one embodiment of the present application, the first pixel area and the second pixel area are provided with a first pixel electrode and a second pixel electrode, respectively; and a portion of the second pixel electrode extends to the first pixel area and partially surrounds the first pixel electrode.

In the display panel according to one embodiment of the present application, the second pixel electrode comprises a first main electrode and a plurality of first branch electrodes electrically connected to the first main electrode, and a portion of the first branch electrodes extends to the first pixel area and partially surrounds the first pixel electrode.

In the display panel according to one embodiment of the present application, the second pixel electrode comprises a first main electrode, a plurality of first border electrodes surrounding the first main electrode, and a plurality of first branch electrodes electrically connected to the first main electrode and the first border electrodes; wherein a portion of the first border electrodes extends to the first pixel area and partially surrounds the first pixel electrode.

In the display panel according to one embodiment of the present application, an included angle between each of the first branch electrodes and the first main electrode ranges from 35 degrees to 45 degrees.

In the display panel according to one embodiment of the present application, the first pixel electrode comprises a second main electrode and a plurality of second branch electrodes electrically connected to the second main electrode, and an included angle between each of the second branch electrodes and the second main electrode ranges from 35 degrees to 45 degrees.

The present application further provides a display device. The display device comprises the display panel of one of the above-mentioned embodiments and a backlight module disposed corresponding to the display panel.

Advantages of the Present Application

In the display panel and the display device provided by the present application, the number of the display domains of the blue sub-pixel is greater than the number of display domains of the red sub-pixel and is greater than the number of the display domains of the green sub-pixel. The blue sub-pixel has a differential design, while the red sub-pixel and the green sub-pixel keep their original designs. Under a precondition of ensuring light transmittance, a proportion of light emitted by the blue sub-pixels is reduced in a displayed screen when viewed at wide viewing angles, thus solving a color shift problem of conventional liquid crystal display devices when viewed at wide viewing angles.

BRIEF DESCRIPTION OF THE SEVERAL VIEWS OF THE DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without inventive work.

DETAILED DESCRIPTION OF SPECIFIC EMBODIMENTS OF THE INVENTION

Figure 1:
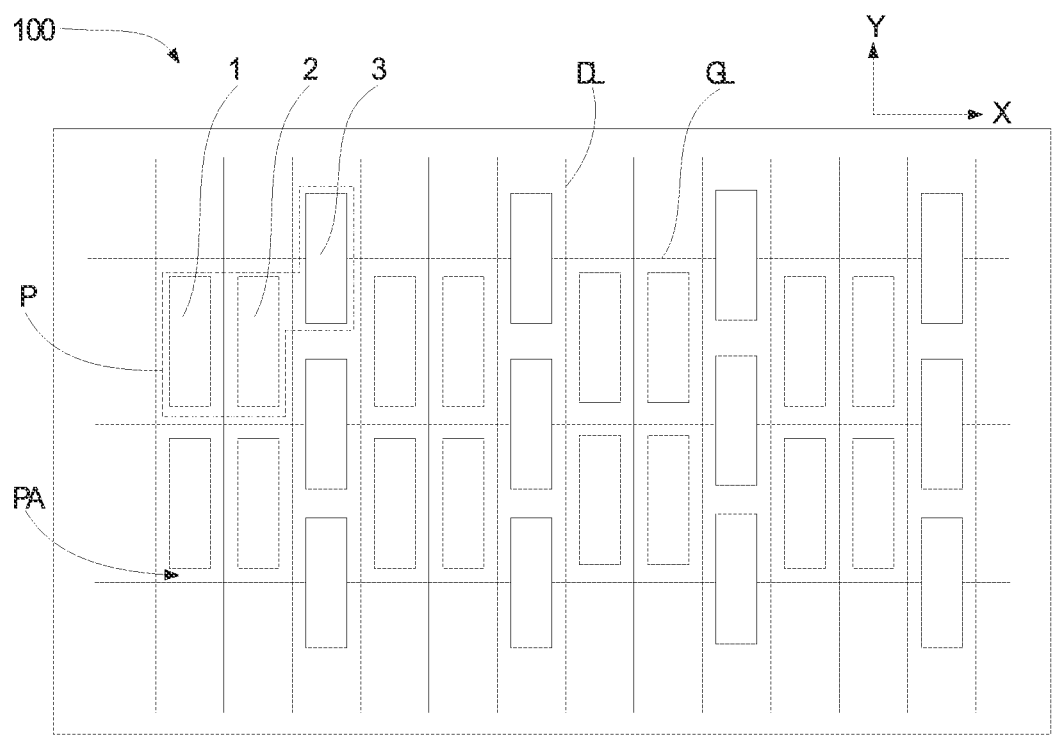
FIG. 1 is a schematic top view illustrating a display panel according to one embodiment of the present application.

A description is provided below to illustrate the embodiments of the present application with reference to the accompanying drawings. The directional terms in the present application, such as "up", "down", "front", "rear", "left", "right", "inner", "outer", and "lateral", are for illustrative purposes based on the accompanying drawings. Therefore, the directional terms are used for ease of explaining and understanding the application, rather than limiting the present application. In the drawings, structurally similar elements are indicated by the same reference numerals. In the drawings, for clear understanding and ease of description, thicknesses of some layers and regions are exaggerated. That is to say, the size and thickness of each component shown in the drawings are not to scale, and the application is not limited in this regard.

Conventional liquid crystal displays (LCDs) have problems of color shifts at wide viewing angles. The inventor found that the LCDs are limited by their own characteristics, light transmittance and chromaticity coordinates are different when viewing from a front (observation based on a vertical normal line) and viewing at wide viewing angles from sides. Speaking of commonly discussed viewing angles, not only contrast ratios but also color shifts change with viewing angles. The color shifts are affected by the viewing angles according to colors or control variables. For example, color shifts are evaluated according to a difference in the chromaticity coordinates between viewing from the front and viewing at 30° viewing angles from a left or right side.

It needs a specific grayscale image to evaluate the color shifts. For example, when the color shifts are evaluated with a skin color image, RGB (RGB represents red, green, and blue pixels respectively) grayscales are: 179/140/102. Take a common LCD display with a four display domain structure as an example, its gamma value is 2.2 when viewed from the front. At this point, an RGB brightness ratio is a specific value. When viewed off-axis, there is a certain degree of light leakage or too much brightness, and an actual gamma value decreases. At this point, an RGB brightness ratio changes greatly, thus causing the color shifts.

Specifically, as a gamma value decreases, a brightness of RGB increases. The brightness of RGB is increased by different degrees, and the RGB brightness ratio varies accordingly. In the RGB brightness ratio, the brightness of R is decreased significantly, the brightness of B is increased significantly, and the brightness of G is relatively unchanged. Therefore, when viewed at off-axis viewing angles, the chromaticity coordinates have obvious blue color shifts, as compared to the chromaticity coordinates when viewed from the front. As a result, the color shifts are worse at wide viewing angles.

When the off-axis gamma value is less, a displayed screen is too bright, and off-axis viewing eventually causes an increase for the brightness of B in the RGB brightness ratio. As a result, the chromaticity coordinates exhibit blue color shifts. Therefore, the inventor first made a differential design for the blue pixels to improve the color shifts.

Figure 2:
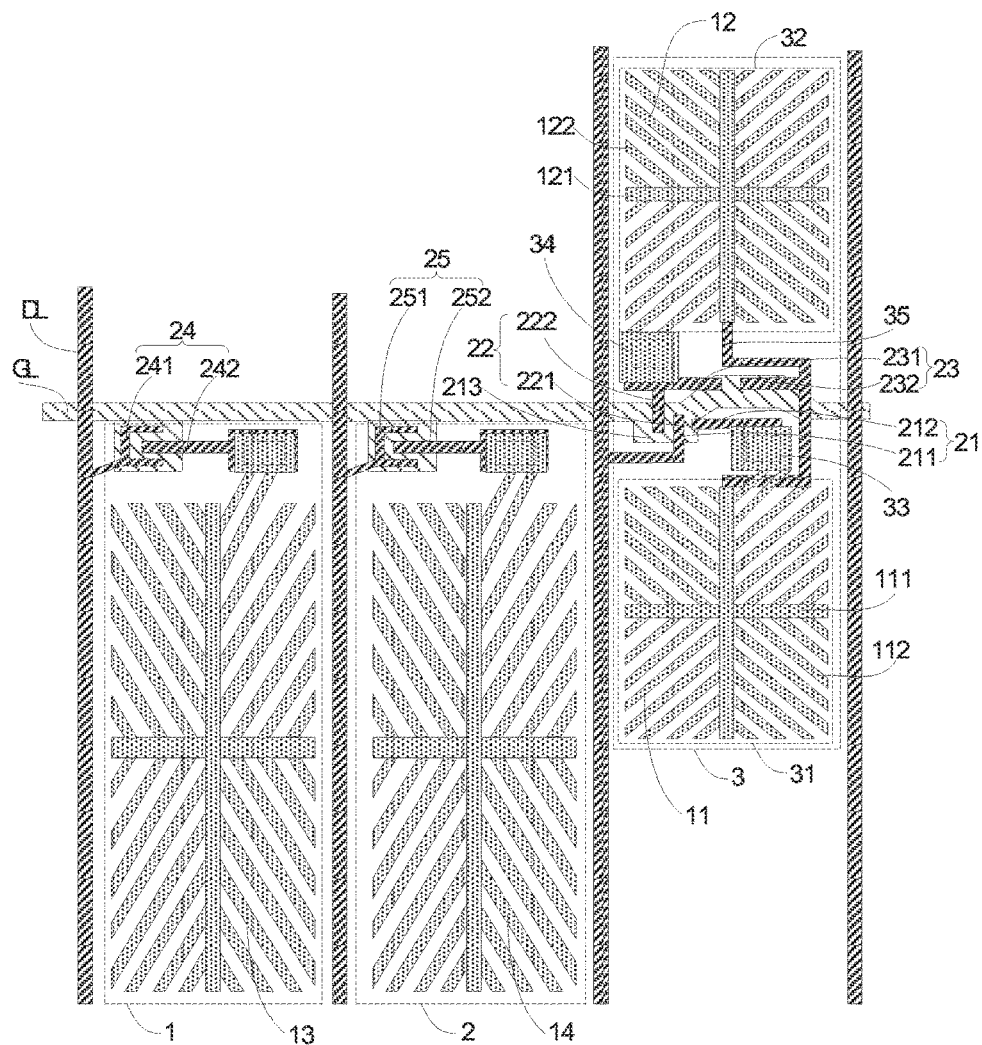
FIG. 2 is a schematic top view illustrating sub-pixels according to one embodiment of the present application.
Figure 3:
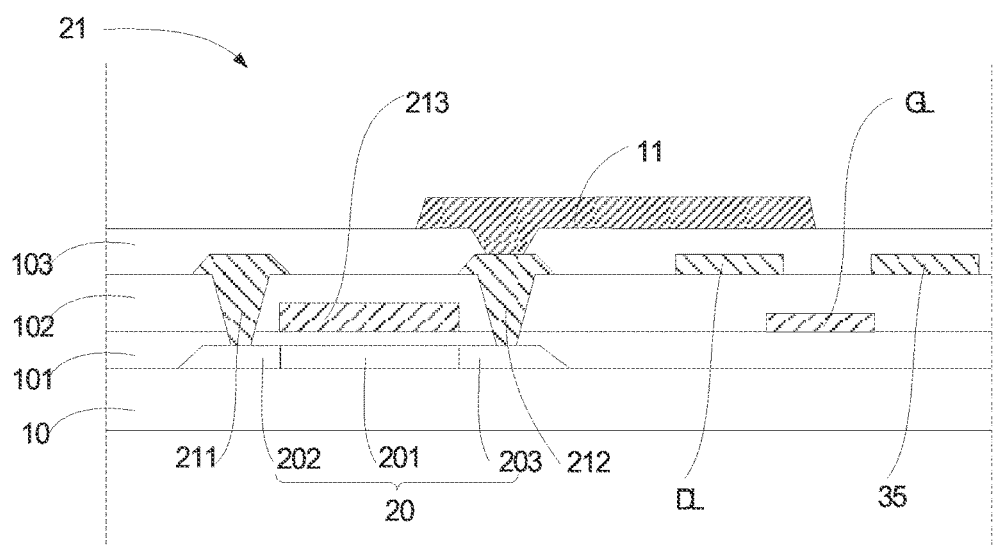
FIG. 3 is a schematic cross-sectional view illustrating a thin film transistor according to one embodiment of the present application.

Please refer to FIGS. 1 to 3 in combination. FIG. 1 is a schematic top view illustrating a display panel according to one embodiment of the present application. FIG. 2 is a schematic top view illustrating sub-pixels according to one embodiment of the present application. FIG. 3 is a schematic cross-sectional view illustrating a thin film transistor (TFT) according to one embodiment of the present application. The display panel 100 comprises red sub-pixels 1, green sub-pixels 2, and blue sub-pixels 3 arranged in sequence. The red sub-pixel 1, the green sub-pixel 2, and the blue sub-pixel 3 together form one pixel unit P. The red sub-pixel 1, the green sub-pixel 2, and the blue sub-pixel 3 respectively provide three primary colors of red, green, and blue for the pixel unit P, so that the pixel unit P can display different colors. The display panel 100 comprises multiple pixel units P. Since each of the pixel units P can display different colors, the display panel 100 realizes color display functions.

Specifically, the display panel 100 further comprises a plurality of gate scan lines GL arranged in parallel along a first direction X and a plurality of data lines DL arranged in parallel along a second direction Y. The gate scan lines GL and the data lines DL intersect to define a plurality of display pixel areas PA. The first direction X is a horizontal direction, the second direction Y is a vertical direction, and an included angle between the first direction X and the second direction Y is 90 degrees. Certainly, the present application is not limited in this regard. The included angle between the first direction X and the second direction Y in the present application can also be other included angles, such as 45 degrees, 60 degrees, etc.

The red sub-pixel 1 and the green sub-pixel 2 are respectively located in two adjacent separate display pixel areas PA, and the blue sub-pixel 3 is located in two adjacent display pixel areas PA. That is to say, the red sub-pixel 1 and the green sub-pixel 2 are each located in one display pixel area PA, while the blue sub-pixel 3 is located in two display pixel areas PA. The blue sub-pixel 3 is divided into two parts by the gate scan line GL, and each part is located in one display pixel area PA.

Pixel structures of the red sub-pixel 1, the green sub-pixel 2, and the blue sub-pixel 3 are specifically described below:

As shown in FIG. 2, the red sub-pixels 1, the green sub-pixels 2, and the blue sub-pixels 3 each comprise a plurality of display domains. A number of the display domains of the blue sub-pixel 3 is greater than a number of the display domains of the red sub-pixel 1 and is greater than a number of the display domains of the green sub-pixel 2. For example, the red sub-pixel 1 and the green sub-pixel 2 each comprise four display domains, and the blue sub-pixel 3 comprises eight display domains. The blue sub-pixel 3 comprises a first pixel area 31 and a second pixel area 32 spaced apart from each other. The first pixel area 31 and the second pixel area 32 each comprise four display domains.

Specifically, taking the blue sub-pixel 3 as an example, the blue sub-pixel 3 is divided into the first pixel area 31 and the second pixel area 32 by the gate scan line GL. The first pixel area 31 and the second pixel area 32 are located at two opposite sides of the gate scan line GL. An area ratio of the first pixel area 31 to the second pixel area 32 is less than 2:3. The first pixel area 31, the red sub-pixel 1, and the green sub-pixel 2 are at a same side. That is to say, the first pixel area 31, the red sub-pixel 1, and the green sub-pixel 2 are located at a same side of the gate scan line GL. The second pixel area 32 is located at the other side of the same gate scan line GL. The first pixel area 31 is a main pixel area, the second pixel area 32 is a sub-pixel area, and brightness of the first pixel area 31 is greater than brightness of the second pixel area 32.

The first pixel area 31 is provided with a first pixel electrode 11, and the second pixel area 32 is provided with a second pixel electrode 12. The second pixel electrode 12 comprises a first main electrode 121 and a plurality of first branch electrodes 122 electrically connected to the first main electrode 121. The first main electrode 121 comprises a first horizontal trunk electrode and a first vertical trunk electrode that are perpendicular to each other. The first horizontal trunk electrode is parallel to the first direction X, and the first vertical trunk electrode is parallel to the second direction Y. The first horizontal trunk electrode and the first vertical trunk electrode divide the second pixel electrode 12 into four display domains, and each display domain comprises multiple first branch electrodes 122. In the same display domain, the first branch electrodes 122 are electrically connected to the first main electrode 121, and extend away from the first main electrode 121. The first branch electrodes 122 are parallel to each other.

The first pixel electrode 11 comprises a second main electrode 111 and a plurality of second branch electrodes 112 electrically connected to the second main electrode 111. The second main electrode 111 comprises a second horizontal trunk electrode and a second vertical trunk electrode that are perpendicular to each other. The second horizontal trunk electrode is parallel to the first direction X, and the second vertical trunk electrode is parallel to the second direction Y. The second horizontal trunk electrode and the second vertical trunk electrode divide the second pixel electrode 12 into four display domains. Each display domain comprises multiple second branch electrodes 112. In the same display domain, the second branch electrodes 112 are electrically connected to the second main electrode 111, and extend away from the second main electrode 111. The second branch electrodes 112 are parallel to each other.

The first pixel area 31 comprises four display domains, and the second pixel area 32 also comprises four display domains, so the blue sub-pixels 3 comprise eight display domains. Correspondingly, the red sub-pixel 1 and the green sub-pixel 2 comprise a third pixel electrode 13 and a fourth pixel electrode 14, respectively. The third pixel electrode 13 comprises a third main electrode and a plurality of third branch electrodes electrically connected to the third main electrode. The third main electrode divides the third pixel electrode 13 into four display domains. The fourth pixel electrode 14 comprises a fourth main electrode, and a plurality of fourth branch electrodes electrically connected to the fourth main electrode. The fourth main electrode divides the fourth pixel electrode 14 into four display domains. Accordingly, the red sub-pixel 1 and the green sub-pixel 2 each comprise four display domains.

Furthermore, the red sub-pixels 1, the green sub-pixels 2, and the blue sub-pixels 3 each further comprises a plurality of thin film transistors (TFTs). Each TFT is electrically connected to the corresponding pixel electrode for supplying a driving voltage to the corresponding pixel electrode. A number of the plurality of TFTs of each blue sub-pixel 3 is greater than a number of the plurality of TFTs of each red sub-pixel 1 and a number of the plurality of TFTs of each green sub-pixel 2.

Referring to FIG. 2, the number of the plurality of TFTs of the red sub-pixel 1 and the number of the plurality of TFTs of the green sub-pixel 2 are both one, and the number of the plurality of TFTs of the blue sub-pixel 3 is three. The TFTs of the blue sub-pixel 3 comprise a first driver TFT 21, a second driver TFT 22, and a voltage divider TFT 23. The first pixel electrode 11 is connected to the first driver TFT 21 through a first via hole 33. The first driver TFT 21 is configured to supply the driving voltage to the first pixel electrode 11. The second pixel electrode 12 is electrically connected to the second driver TFT 22 through a second via hole 34, and the second driver TFT 22 is configured to supply the driving voltage to the second pixel electrode 12. The voltage divider TFT 23 and the second driver TFT 22 are connected in series, so as to lower the driving voltage supplied by the second driver TFT 22 to the second pixel electrode 12.

The first driver TFT 21, the second driver TFT 22, and the voltage divider TFT 23 all include a gate, a source, and a drain. The first driver TFT 21 shown in FIG. 2 includes a source 211, a drain 212, and a gate 213. The gates of all TFTs (in one pixel unit) are connected to the same gate scan line GL or integrally formed.

Specifically, the source 211 of the first driver TFT 21 and a source 221 of the second driver TFT 22 are integrally formed and electrically connected to the same data line DL. The drain 212 of the first driver TFT 21 is electrically connected to the first pixel electrode 11, and a drain 222 of the second driver TFT 22 is electrically connected to the second pixel electrode 12. A source 231 of the voltage divider TFT 23 is electrically connected to the drain 222 of the second driver TFT 22, and a drain 232 of the voltage divider TFT 23 is electrically connected to a share bar 35. The share bar 35, the data line DL, the source, and the drain are arranged in a same layer.

The first driver TFT 21 and the second driver TFT 22 receive data signals from the same data line DL, and the second driver TFT 22 is connected in series with the voltage divider TFT 23. Therefore, the driving voltage supplied by the second driver TFT 22 to the second pixel electrode 12 is lower than the driving voltage supplied by the first driver TFT 21 to the first pixel electrode 11, so that brightness of the first pixel area 31 is greater than brightness of the second pixel area 32. As a result, the brightness of the blue sub-pixel 3 is mainly contributed by the first pixel area 31. Particularly, when mid-to-low grayscale levels are displayed, the second pixel area 32 may not be lit, and the brightness of the blue sub-pixel 3 is mainly contributed by the first pixel area 31, so that a proportion of blue light emitted by the blue sub-pixel 3 in an entire displayed screen of the display panel 100 is lowered, which improves a problem in conventional LCDs that the chromaticity coordinates exhibit the blue color shift due to an increased proportion of the blue light arising from the gamma value becoming less and the displayed screen becoming too bright when viewed at off-axis wide viewing angles.

Also, the blue sub-pixel 3 has an eight-domain display structure, and is divided into the first pixel area 31 and the second pixel area 32. In order to realize voltage division for the first pixel area 31 and the second pixel area 32, the blue sub-pixel 3 comprises three TFTs, so various lines have to be arranged in the blue sub-pixel 3. Taking the share bar 35 for example, the share bar 35 is arranged in a middle of the first pixel area 31 and the second pixel area 32. That is to say, the share bar 35 is arranged corresponding to the first vertical trunk electrode and the second vertical trunk electrode. As a result, the share bar 35 not only can discharge the voltage divider TFT 23, but also can provide a light-shielding effect. This way, when the display panel 100 is observed at wide viewing angles, the share bar 35 can partially block light and prevent light leakage at wide viewing angles, so that a light output of the blue sub-pixel 3 is reduced, and the entire displayed screen of the display panel 100 has a lower proportion of blue light, which improves the problem of the blue color shift in the chromaticity coordinates resulting from a fact that a proportion of the blue light is increased when viewed at the off-axis wide viewing angles.

In addition, the red sub-pixel 1 and the green sub-pixel 2 adopt a four-domain display structure provided with only one TFT. Compared with the blue sub-pixel 3 having the eight-domain display structure, there is no need to arrange many lines in the red sub-pixel 1 and the green sub-pixel 2. Therefore, an aperture ratio of the display panel 100 can be improved.

Specifically, the red sub-pixel 1 comprises a third driver TFT 24, and the green sub-pixel 2 comprises a fourth driver TFT 25. The third driver TFT 24 and the fourth driver TFT 25 both also comprise a gate, a source, and a drain. The gate is also electrically connected to the corresponding gate scan line GL. The gates of the TFTs of the red sub-pixel 1, the green sub-pixel 2, and the blue sub-pixel 3 in the same pixel unit P are connected to the same gate scan line GL.

A source 241 of the third driver TFT 24 and a source 251 of the fourth driver TFT 25 are both electrically connected to the corresponding data line DL. A drain 242 of the third driver TFT 24 is connected to the third pixel electrode 13 through a third via hole, and a drain 252 of the fourth driver TFT 25 is connected to the fourth pixel electrode 14 through a fourth via hole. The gates of the TFTs of the red sub-pixel 1, the green sub-pixel 2 and the blue sub-pixel 3 are on a same horizontal line. The gates being on the same horizontal line means that the gates of the TFTs are all arranged near the same gate scan line GL.

A film structure of the TFT in each sub-pixel is specifically described below by taking the first driver TFT 21 as an example:

As shown in FIG. 3, the first driver TFT 21 is disposed on a substrate 10. Optionally, the substrate 10 can be a rigid substrate or a flexible substrate. When the substrate 10 is a rigid substrate, the substrate 10 can comprise a rigid substrate such as a glass substrate. When the substrate 10 is a flexible substrate, the substrate 10 can comprise a flexible substrate such as a polyimide (PI) film and an ultra-thin glass film.

Optionally, the first driver TFT 21 comprises an active layer 20, a gate insulating layer 101, a gate layer, an interlayer insulating layer 102, a source/drain layer, and a passivation layer 103 which are sequentially stacked on the substrate 10. Optionally, a buffer layer (not illustrated) can be disposed between the substrate 10 and the active layer 20. The buffer layer can prevent undesired impurities or contaminants (such as moisture and oxygen) from diffusing from the substrate 10 into devices that can be damaged by these impurities or contaminants, while also ensuring a flat top surface.

The active layer 20 is disposed on the buffer layer. The active layer 20 comprises a channel region 201, and a source doped region 202 and a drain doped region 203 located at two sides of the channel region 201.

The gate insulating layer 101 covers the active layer 20 and the buffer layer. The gate layer is disposed on the gate insulating layer 101. The gate layer comprises the gate 213 arranged corresponding to the channel region 201 of the active layer 20. Certainly, the gate layer also comprises other signal lines such as the gate scan lines GL arranged in a same layer as the gate 213.

The interlayer insulating layer 102 covers the gate layer and the gate insulating layer 101. The source/drain layer is disposed on the interlayer insulating layer 102, and the source/drain layer comprises the source 211 and the drain 212. The source 211 is electrically connected to the source doped region 202, and the drain 212 is electrically connected to the drain doped region 203. Certainly, the source/drain layer also comprises signal lines such as the data lines DL. For example, the share bar 35 and the data lines DL can be arranged in a same layer.

The passivation layer 103 covers the source/drain layer and the interlayer insulating layer 102. The passivation layer 103 is provided with a via hole, and the first pixel electrode 11 is electrically connected to the drain 212 of the first driver TFT 21 through the via hole.

It should be noted that the "same layer arrangement" in the present application means that in a manufacturing process, a film layer formed of a same material is patterned to obtain at least two different features, and the at least two different features are in the same layer. For example, in the present embodiment, the data line DL and the share bar 35 are obtained by patterning a same conductive film layer, so the data lines DL and the share bar 35 are arranged in a same layer.

In addition, the TFT structure shown in FIG. 3 is only an example to illustrate the TFT structure of each sub-pixel, and the present application is not limited in this regard. The TFT of each sub-pixel in the present application can also be other types of TFTs, such as a bottom-gate type and an etch-stop type.

Moreover, slit angles of the red sub-pixel 1, the green sub-pixel 2, and the blue sub-pixel 3 of the present application can be set as desired. However, in order to further improve the light transmittance of the display panel 100 and alleviate the color shift of the display panel 100, the slit angles of the red sub-pixel 1, the green sub-pixel 2, and the blue sub-pixel 3 can be differentiated. The slit angle is an angle between the branch electrode and the main electrode of the pixel electrode. For example, in order to improve the light transmittance of the display panel 100, the angle between the branch electrode and the main electrode can be 45 degrees. In order to further improve the color shift of the display panel 100, the angle between the branch electrode and the main electrode can be 35 degrees.

Specifically, the present application mainly improves the blue color shift problem in the chromaticity coordinates resulting from a higher proportion of the blue light when viewed at off-axis wide viewing angles. Therefore, the slit angle of the blue sub-pixel 3 can be designed differently. In the blue sub-pixel 3, the slit angle of the second pixel electrode 12 is set to between 35 degrees and 45 degrees. In other words, an angle between each of the first branch electrodes 122 and the first main electrode 121 is set to between 35 degrees and 45 degrees. Preferably, the angle between each of the first branch electrodes 122 and the first main electrode 121 is set to 35 degrees in order to better improve the color shift problem.

Alternatively, in the blue sub-pixel 3, the slit angles of the first pixel electrode 11 and the second pixel electrode 12 are both set between 35 degrees and 45 degrees. That is to say, an angle between each of the second branch electrodes 112 and the second main electrode 111 is set between 35 degrees and 45 degrees. Preferably, the angle between each of the second branch electrodes 112 and the second main electrode 111 is set to 35 degrees, so as to better improve the color shift problem.

Certainly, when the angle between each of the first branch electrodes 122 and the first main electrode 121 and the angle between each of the second branch electrodes 112 and the second main electrode 111 are both set to 35 degrees, the color shift problem can be further improved to a greater degree. Moreover, in order to ensure the light transmittance of the display panel 100, in the red sub-pixel 1 and the green sub-pixel 2, the slit angles of the third pixel electrode 13 and the fourth pixel electrode 14 can be set to 45 degrees.

Figure 4:
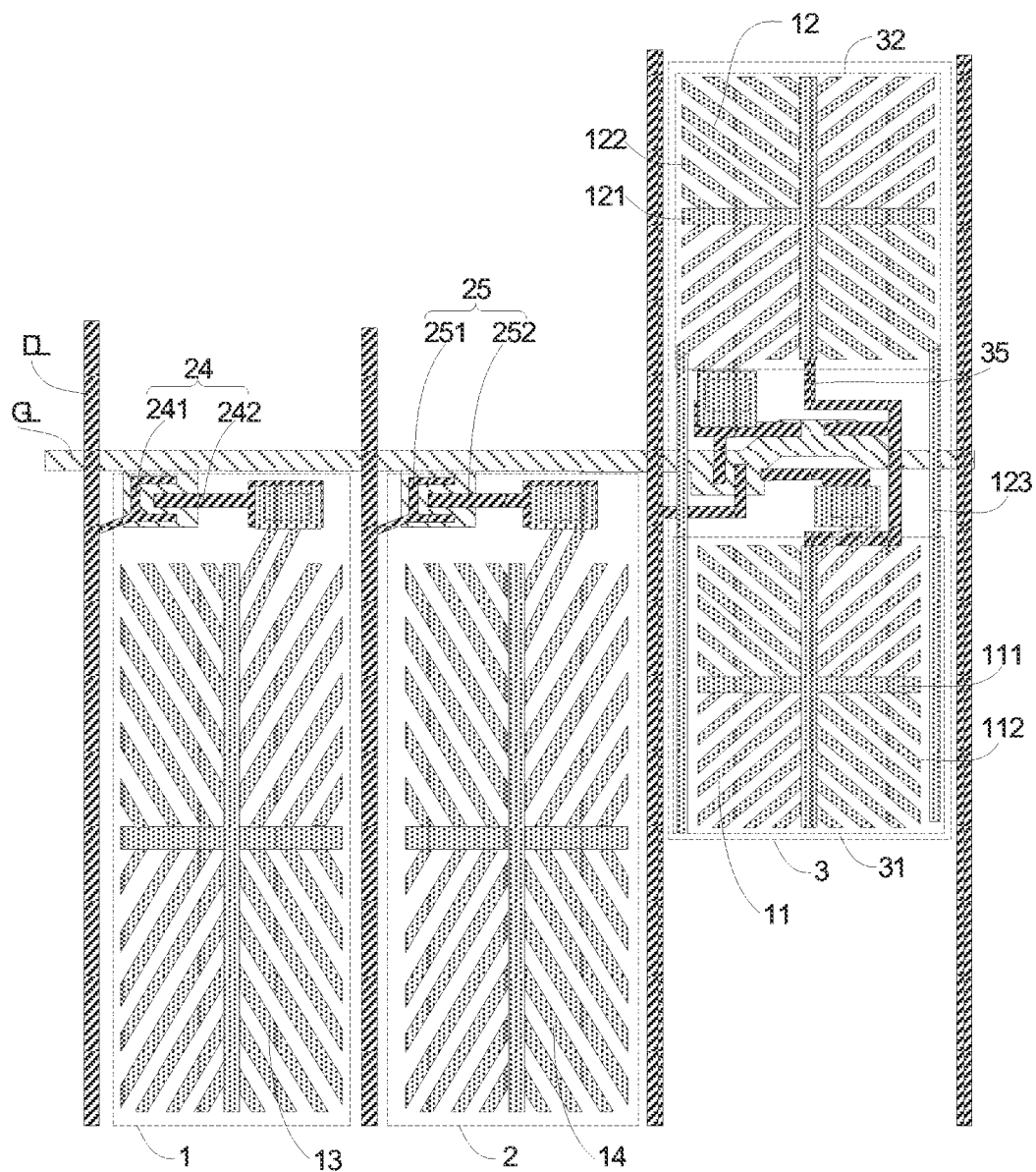
FIG. 4 is a schematic top view illustrating the sub-pixels according to another embodiment of the present application.

Please refer to FIG. 4, which is a schematic top view illustrating the sub-pixels according to one embodiment of the present application. The present embodiment is different from the foregoing embodiment in that, the first pixel area 31 and the second pixel area 32 are respectively provided with a first pixel electrode 11 and a second pixel electrode 12, a portion of the second pixel electrode 12 extends to the first pixel area 31 and partially surrounds the first pixel electrode 11. In detail, a portion of the first branch electrodes 122 of the second pixel electrode 12 extends to the first pixel area 31 and partially surrounds the first pixel electrode 11.

Specifically, a plurality of extending electrode portions 123 of the first branch electrodes 122 extending into the first pixel area 31 are parallel to the second direction Y, and the extending electrode portions 123 are located at edges of the first pixel area 31 and close to the data lines DL. The extending electrode portions 123 are located at two opposite sides of the first pixel electrode 11 and partially surround the first pixel electrode 11. This way, the extending electrode portions 123 can function to shield the data lines DL, avoid parasitic capacitance between the data line DL and the first pixel electrode 11, and reduce crosstalk. At the same time, due to the presence of the extending electrode portions 123, there is no need to provide a shielding layer at the edges of the first pixel area 31, which can further increase the aperture ratio of the display panel 100. For other details, please refer to the above-mentioned embodiment, and a detailed description thereof is omitted herein for brevity.

Figure 5:
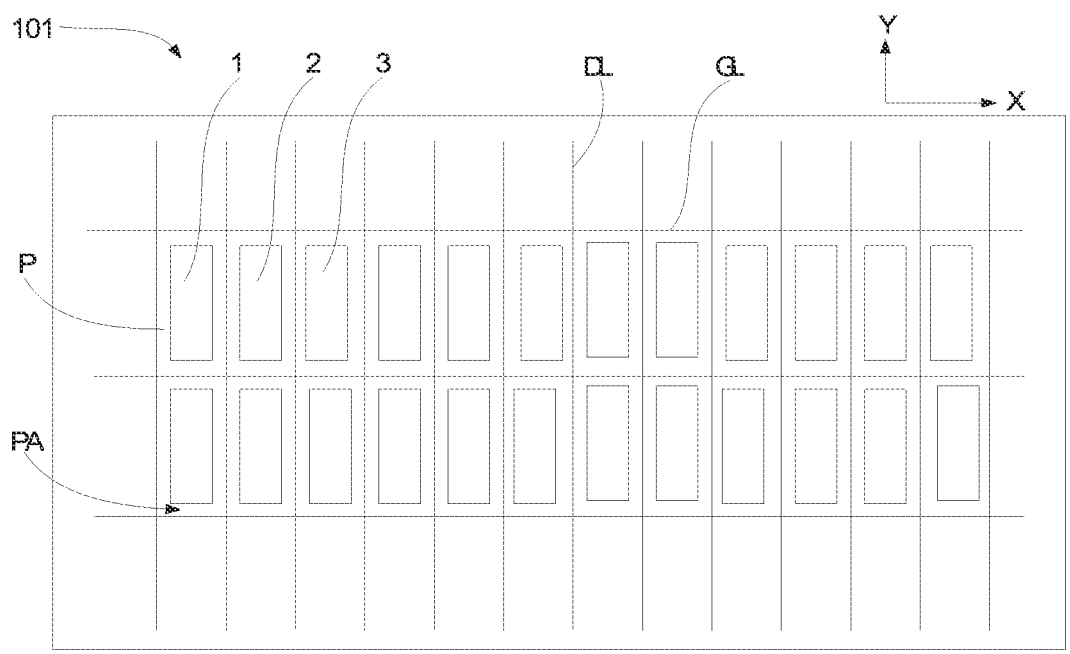
FIG. 5 is a schematic top view illustrating the display panel according to another embodiment of the present application.
Figure 6:
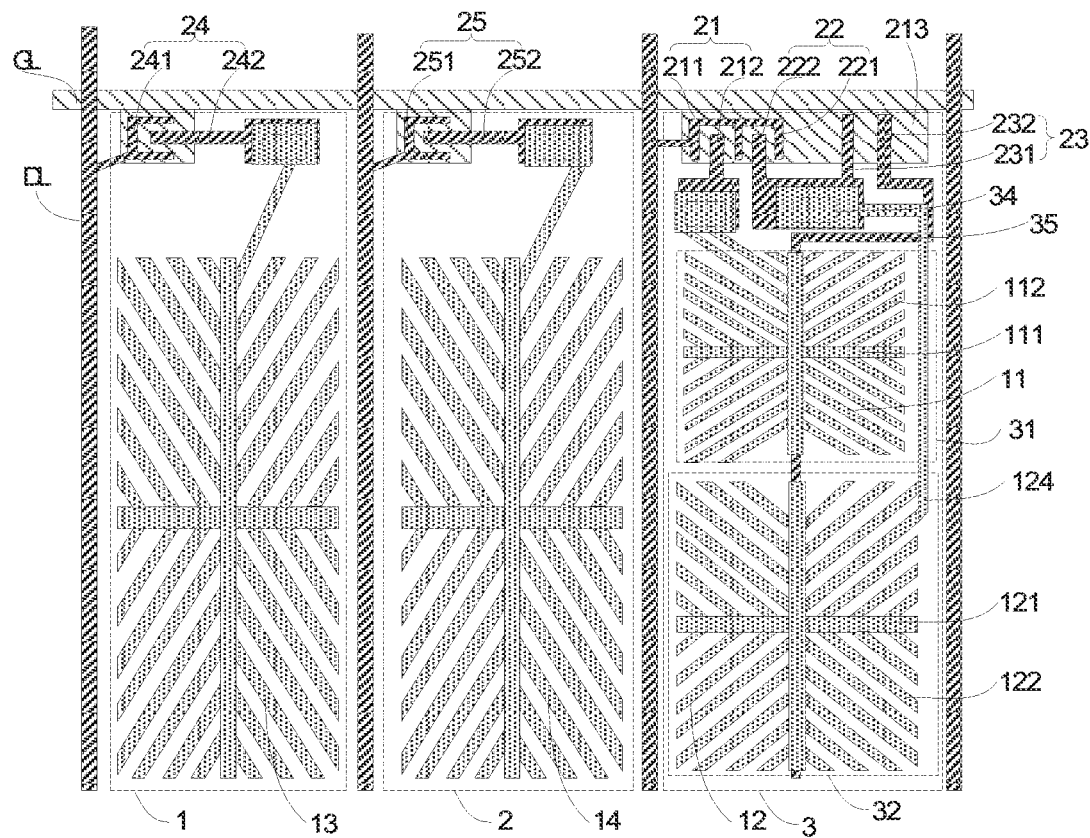
FIG. 6 is a schematic top view illustrating the sub-pixels according to still another embodiment of the present application.

Please refer to FIGS. 5 and 6 illustrated according to one embodiment of the present application. FIG. 5 is another top view illustrating the display panel of the present application. FIG. 6 is still another top view illustrating the sub-pixels according to the present application. The present embodiment is different from the above-mentioned embodiments in that the first pixel area 31 and the second pixel area 32 of the blue sub-pixel 3 are located at a same side of the gate. That is to say, the blue sub-pixel 3, the red sub-pixel 1, and the green sub-pixel 2 are arranged at a same side of the gate scan line GL; and the first pixel area 31 and the second pixel area 32 are located in the same display pixel area PA.

Specifically, the second pixel area 32 is located at one side of the first pixel area 31 away from the gate scan line GL, and the second pixel electrode 12 in the second pixel area 32 is provided with a connection electrode 124. The connection electrode 124 extends through an edge of the first pixel area 31. The connection electrode 124 is spaced apart from the first pixel electrode 11 and is used to connect the second pixel electrode 12 and the drain 22 of the second driver TFT 222. For other details, please refer to the above-mentioned embodiment, and a detailed description is omitted herein for brevity.

Figure 7:
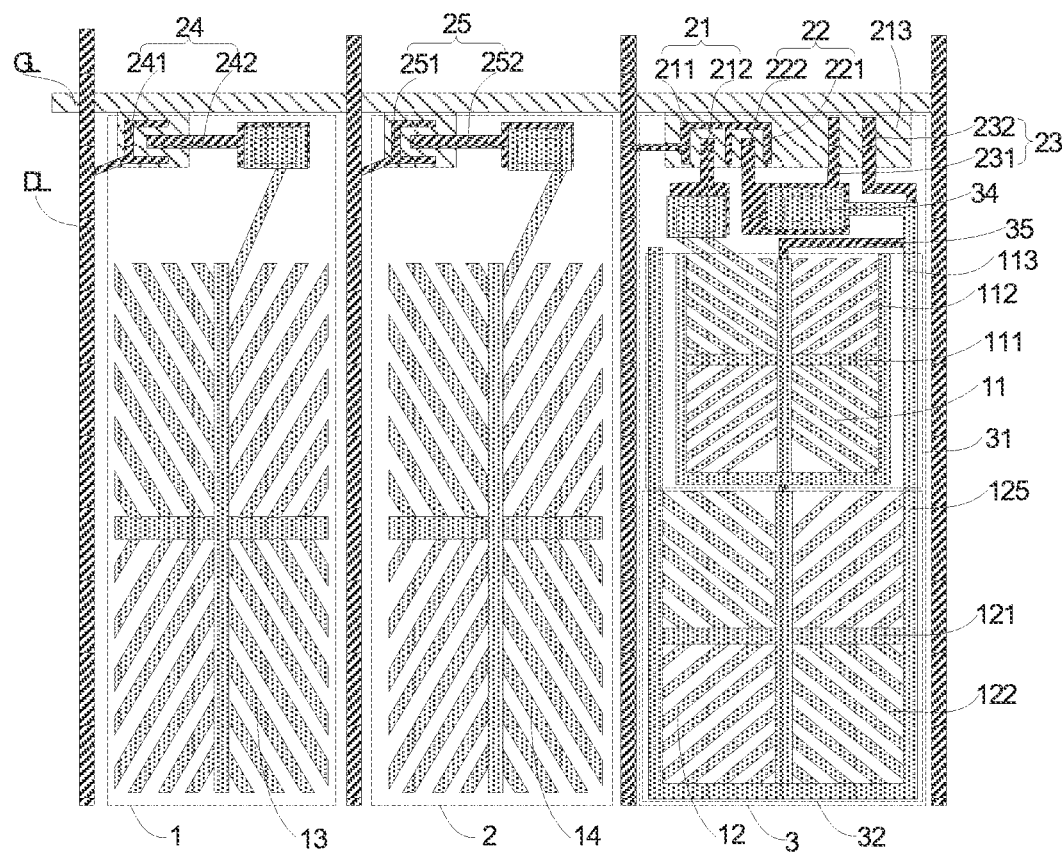
FIG. 7 is a schematic top view illustrating the sub-pixels according to yet still another embodiment of the present application.

Please refer to FIG. 7 according to one embodiment of the present application. FIG. 7 is still another top view illustrating the sub-pixels according to the present application. The present embodiment is different from the above-mentioned embodiments in that the second pixel electrode 12 comprises a first main electrode 121, a plurality of first border electrodes 125 surrounding the first main electrode 121, and a plurality of first branch electrodes 122 connected to the first main electrode 121 and the first border electrodes 125. A portion of the first border electrodes 125 extends to the first pixel area 31 and partially surrounds the first pixel electrode 11. The first pixel electrode 11 comprises a second main electrode 111, a plurality of second border electrodes 113 surrounding the second main electrode 111, and a plurality of second branch electrodes 112 electrically connected to the second main electrode 111 and the second border electrodes 113. The first border electrodes 125 extending to the first pixel area 31 are arranged in parallel and spaced apart from a portion of the second border electrode 113, and one of the first border electrodes 125 extending to the first pixel area 31 is connected to the drain 222 of the second driver TFT 22, and other first border electrodes 125 that are not connected to the drain 222 of the second driver TFT 22 can shield the data lines DL to prevent parasitic capacitance generated between the data line DL and the first pixel electrode 11 and reduce crosstalk. At the same time, due to the presence of the first border electrodes 125 extending to the first pixel area 31, there is no need to provide a shielding layer at edges of the first pixel area 31, thus increasing an aperture ratio of the display panel 100. For other details, please refer to the above-mentioned embodiment, and a detailed description thereof is omitted herein for brevity.

Figure 8:
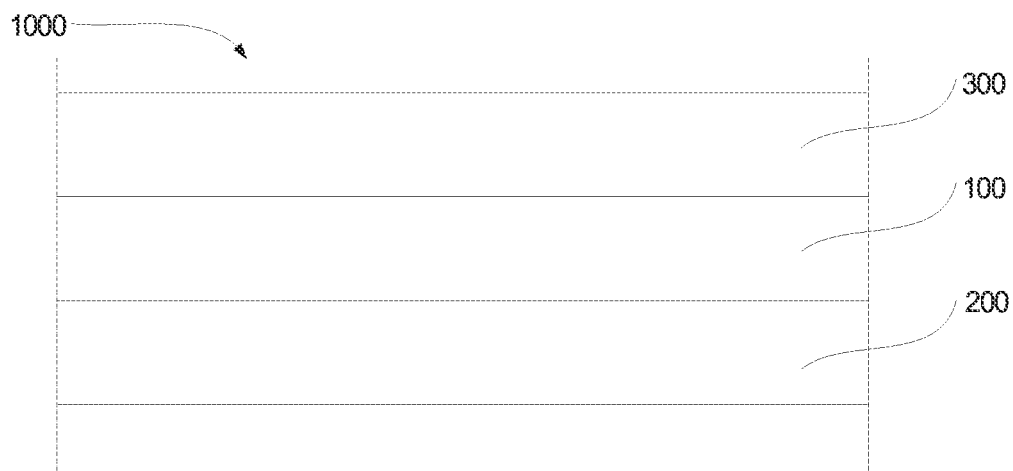
FIG. 8 is a schematic cross-sectional view illustrating a display device according to one embodiment of the present application.

Please refer to FIG. 8 illustrated according to one embodiment of the present application. FIG. 8 is a schematic cross-sectional view illustrating a display device according to one embodiment of the present application. The display device 1000 comprises the display panel 100 of one of the above-mentioned embodiments, a backlight module 200 disposed corresponding to the display panel 100, and a cover plate 300 covering the display panel 100.

According to the above embodiments, it can be known that:

The present application provides a display panel and a display device. The display panel comprises red sub-pixels, green sub-pixels, and blue sub-pixels arranged in sequence. A number of display domains of the blue sub-pixel is greater than a number of display domains of the red sub-pixel and is greater than a number of display domains of the green sub-pixel. The blue sub-pixels have a differential design, while the red sub-pixels and the green sub-pixels maintain their original designs. Therefore, under a premise of ensuring light transmittance, a proportion of light emitted by the blue sub-pixels is reduced in a displayed screen when viewed at wide viewing angles. Accordingly, the present application solves a color shift problem in conventional liquid crystal displays.

In the above-mentioned embodiments, the description of each embodiment has its own emphasis. For those that are not described in detail in one embodiment, reference can be made to related descriptions of other embodiments.

The present application is described in detail above, and specific examples are provided in the present disclosure to illustrate the working principles and embodiments of the present application. The above descriptions are only provided for ease of understanding the technical solutions and main ideas of the present application. Persons of ordinary skill in the art can still modify the technical solutions described in the foregoing embodiments, or equivalently replace some of the technical features. Such modifications or replacements should be deemed to be within the protection scope of the technical solution of each embodiment.

What is claimed is:

1. A display panel, comprising:
   red sub-pixels, green sub-pixels, and blue sub-pixels,
   wherein the red sub-pixels, the green sub-pixels, and the blue sub-pixels each comprise a plurality of display domains, and a number of the display domains of each blue sub-pixel is greater than a number of the display domains of each red sub-pixel and is also greater than a number of the display domains of each green sub-pixel,
   wherein the red sub-pixels and the green sub-pixels each comprise four display domains, the blue sub-pixels each comprise eight display domains, the blue sub-pixels each comprise a first pixel area and a second pixel area spaced apart from each other, and the first pixel areas and the second pixel areas each comprise four display domains,
   wherein the red sub-pixels, the green sub-pixels, and the blue sub-pixels all comprise a plurality of thin film transistors (TFTs), and a number of the plurality of TFTs of each blue sub-pixel is greater than a number of the plurality of TFTs of each red sub-pixel and a number of the plurality of TFTs of each green sub-pixel, and a plurality of gates of the plurality of TFTs of each of the red sub-pixels, the green sub-pixels, and the blue sub-pixels are connected to a same gate scan line,
   wherein for each blue sub-pixel, the first pixel area and the second pixel area are arranged at two opposite sides of the gate scan line, wherein for each blue sub-pixel, brightness of the first pixel area is greater than brightness of the second pixel area; and the first pixel area, the red sub-pixel, and the green sub-pixel are arranged at a same side of the gate scan line.

2. The display panel according to claim 1, wherein an area ratio of the first pixel area to the second pixel area is less than 2:3.

3. The display panel according to claim 1, wherein the first pixel area and the second pixel area are provided with a first pixel electrode and a second pixel electrode, respectively; and a portion of the second pixel electrode extends to the first pixel area and partially surrounds the first pixel electrode.

4. The display panel according to claim 3, wherein the second pixel electrode comprises a first main electrode and a plurality of first branch electrodes electrically connected to the first main electrode, and a portion of the first branch electrode extends to the first pixel area and partially surrounds the first pixel electrode.

5. The display panel according to claim 3, wherein the second pixel electrode comprises a first main electrode, a first border electrode surrounding the first main electrode, and a plurality of first branch electrodes electrically connected to the first main electrode and the first border electrode; and a portion of the first border electrode extends to the first pixel area and partially surrounds the first pixel electrode.

6. The display panel according to claim 5, wherein an included angle between each of the first branch electrodes and the first main electrode ranges from 35 degrees to 45 degrees.

7. The display panel according to claim 6, wherein the first pixel electrode comprises a second main electrode and a plurality of second branch electrodes electrically connected to the second main electrode, and an included angle between each of the second branch electrodes and the second main electrode ranges from 35 degrees to 45 degrees.

8. A display device, comprising:
   a display panel and a backlight module arranged corresponding to the display panel, the display panel comprising red sub-pixels, green sub-pixels, and blue sub-pixels;
   wherein the red sub-pixels, the green sub-pixels, and the blue sub-pixels each comprises a plurality of display domains, and a number of the display domains of each blue sub-pixel is greater than a number of the display domains of each red sub-pixel and is also greater than a number of the display domains of each green sub-pixel,
   wherein the red sub-pixels and the green sub-pixels each comprise four display domains, the blue sub-pixels each comprise eight display domains; the blue sub-pixels each comprise a first pixel area and a second pixel area spaced apart from each other, and the first pixel areas and the second pixel areas each comprise four display domains,
   wherein the red sub-pixels, the green sub-pixels, and the blue sub-pixels all comprise a plurality of thin film transistors (TFTs), and a number of the plurality of TFTs of each blue sub-pixel is greater than a number of the plurality of TFTs of each red sub-pixel and a number of the plurality of TFTs of each green sub-pixel, and a plurality of gates of the plurality of TFTs of each of the red sub-pixels, the green sub-pixels, and the blue sub-pixels are connected to a same gate scan line,
   wherein for each blue sub-pixel, the first pixel area and the second pixel area are arranged at two opposite sides of the gate scan line, wherein for each blue sub-pixel, brightness of the first pixel area is greater than brightness of the second pixel area; and the first pixel area, the red sub-pixel, and the green sub-pixel are arranged at a same side of the gate scan line.

9. The display device according to claim 8, wherein an area ratio of the first pixel area to the second pixel area is less than 2:3.

10. The display device according to claim 8, wherein the first pixel area and the second pixel area are provided with a first pixel electrode and a second pixel electrode, respectively; and a portion of the second pixel electrode extends to the first pixel area and partially surrounds the first pixel electrode.

\* \* \* \* \*